(12) United States Patent
Tseng

(10) Patent No.: US 7,414,679 B2
(45) Date of Patent: Aug. 19, 2008

(54) DISPLAY PANEL INCLUDING A JOINT AND ADDRESS LINE HAVING PROTRUDING PORTIONS, AND METHOD FOR REPAIRING THE SAME

(75) Inventor: Chiang-Hung Tseng, Toufen Town (TW)

(73) Assignee: Chi Mei Optoelectronic Inc., Tainan County (TW)

( * ) Notice: Subject to any disclaimer, the term of this patent is extended or adjusted under 35 U.S.C. 154(b) by 640 days.

(21) Appl. No.: 10/935,985

(22) Filed: Sep. 8, 2004

(65) Prior Publication Data

US 2005/0068283 A1  Mar. 31, 2005

(30) Foreign Application Priority Data

Sep. 29, 2003  (TW) ............................. 92126848 A (51) Int. Cl.
*G02F 1/1343* (2006.01)
(52) U.S. Cl. .................... 349/55; 349/54; 349/139; 349/192
(58) Field of Classification Search .................. 349/55, 349/54, 192
See application file for complete search history.

(56) References Cited

U.S. PATENT DOCUMENTS

| | | | | |
|---|---|---|---|---|
| 5,335,102 A | * | 8/1994 | Kanemori et al. | 349/55 |
| 5,995,178 A | * | 11/1999 | Fujikawa et al. | 349/55 |
| 6,100,948 A | * | 8/2000 | Kim et al. | 349/39 |
| 6,476,882 B1 | * | 11/2002 | Sakurai | 349/55 |
| 6,628,368 B2 | * | 9/2003 | Yang | 349/192 |
| 6,642,973 B2 | * | 11/2003 | Cheng et al. | 349/55 |
| 6,980,264 B2 | * | 12/2005 | Lee et al. | 349/54 |
| 7,098,981 B2 | * | 8/2006 | Nakayoshi et al. | 349/141 |
| 7,113,252 B2 | * | 9/2006 | Murakami et al. | 349/192 |

* cited by examiner

*Primary Examiner*—Andrew Schechter
(74) *Attorney, Agent, or Firm*—Thomas, Kayden, Horstemeyer & Risley (57) ABSTRACT

The present invention relates to a display panel comprising a circuit structure, which comprises at least one data line and a pixel electrode. There is a dummy data line provided between the pixel electrode and the data line, wherein the data line has at least two protrusions extending to the corresponding position of the dummy data line. When the data line is disconnected, repair can be made by welding the protrusions and the dummy data line by laser, and thus no extra circuit is needed.

22 Claims, 12 Drawing Sheets

DISPLAY PANEL INCLUDING A JOINT AND ADDRESS LINE HAVING PROTRUDING PORTIONS, AND METHOD FOR REPAIRING THE SAME

BACKGROUND OF THE INVENTION

1. Field of the Invention

The present invention relates to a display panel, especially to a circuit structure of a display panel and a method for repairing disconnection of the circuit of a display panel.

2. Description of the Related Art

Figure 1:
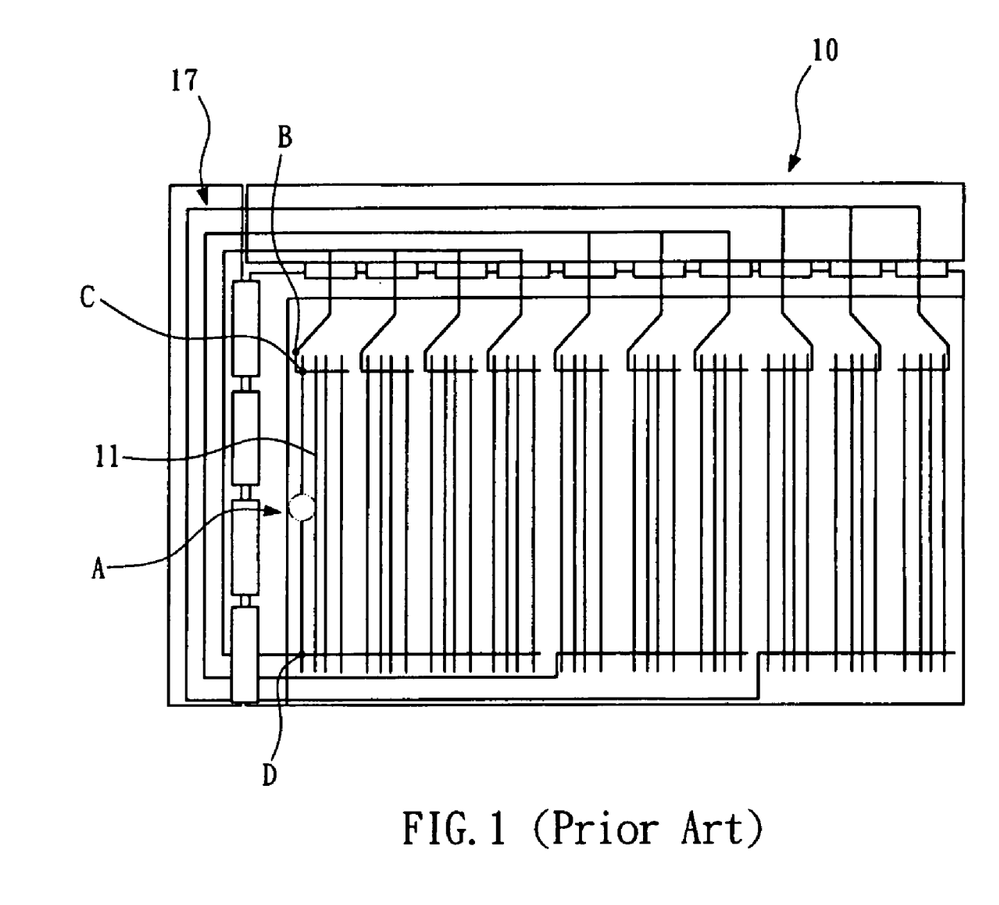
FIG. 1 is a top view of a conventional display panel.
Figure 2:
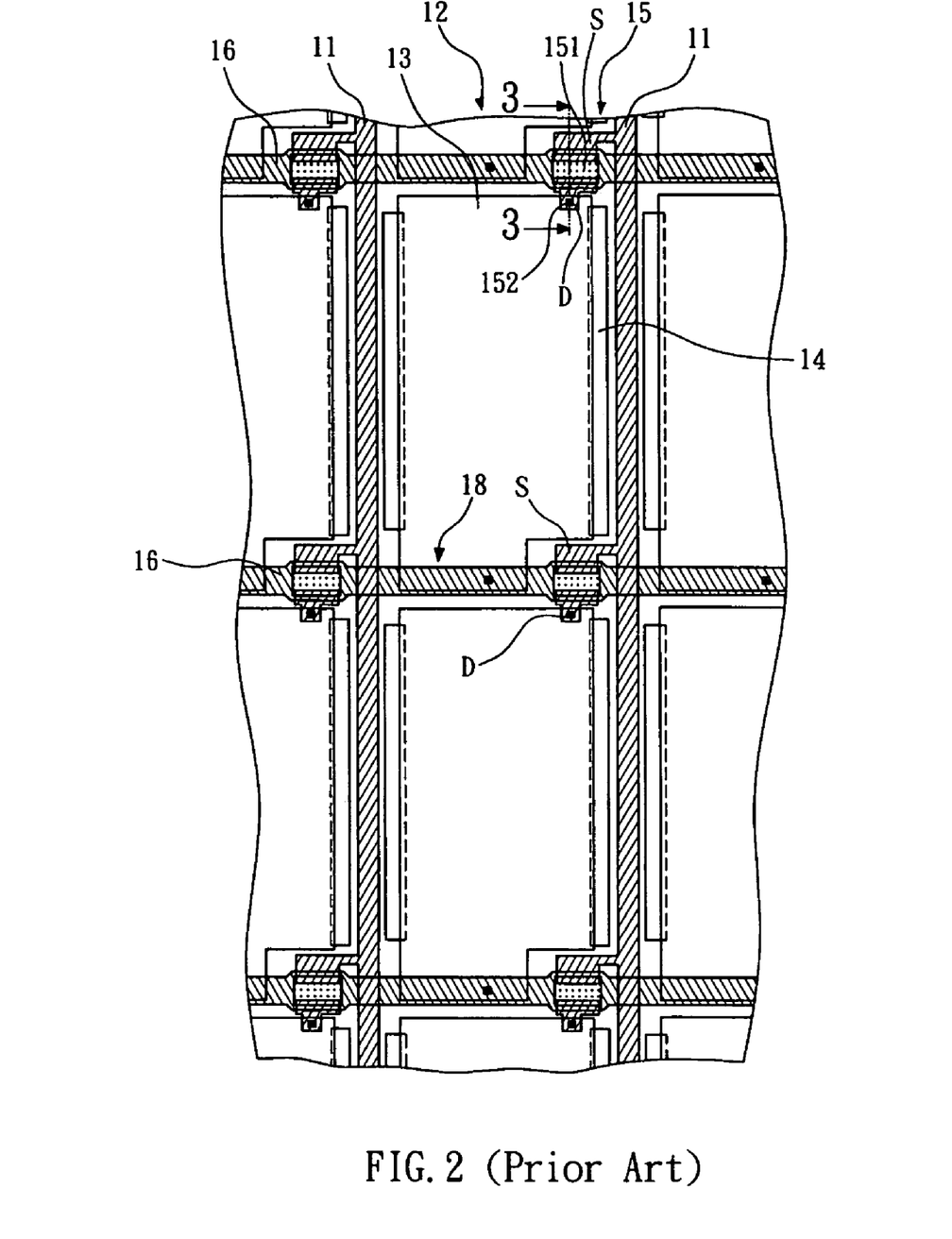
FIG. 2 is a local enlarged view of a conventional display panel of FIG. 1.

FIGS. 1 and 2 show a top view and a local enlarged view of a conventional display panel, respectively. The conventional display panel 10 comprises a plurality of address lines and a plurality of pixel electrodes 13. The address lines are a plurality of data lines 11 in the vertical direction and a plurality of scan lines 16 in the horizontal direction. The data lines 11 and the scan lines 16 are perpendicular to each other and are oriented transverse to each other.

Referring to FIG. 2, a local enlarged view of the conventional display panel of FIG. 1 is shown. The display panel 10 comprises at least one circuit structure 12 that comprises at least one data line 11, a scan line 16, a pixel electrode 13, a thin film transistor 15 and a storage capacitor 18.

The pixel electrode 13 and the data line 11 have a dummy data line 14 therebetween. The dummy data line 14 is a floating circuit and comprises an opaque layer for shading light in order to avoid the leakage caused by the disclination of the liquid crystal in the margin of the pixel electrode 13 and to increase the tolerance during the alignment between the upper and lower substrates so as to increase the open ratio. The material of the dummy data line 14 is metal. The thin film transistor 15 is electrically connected to the pixel electrode 13 so as to control the pixel electrode 13.

Figure 3:
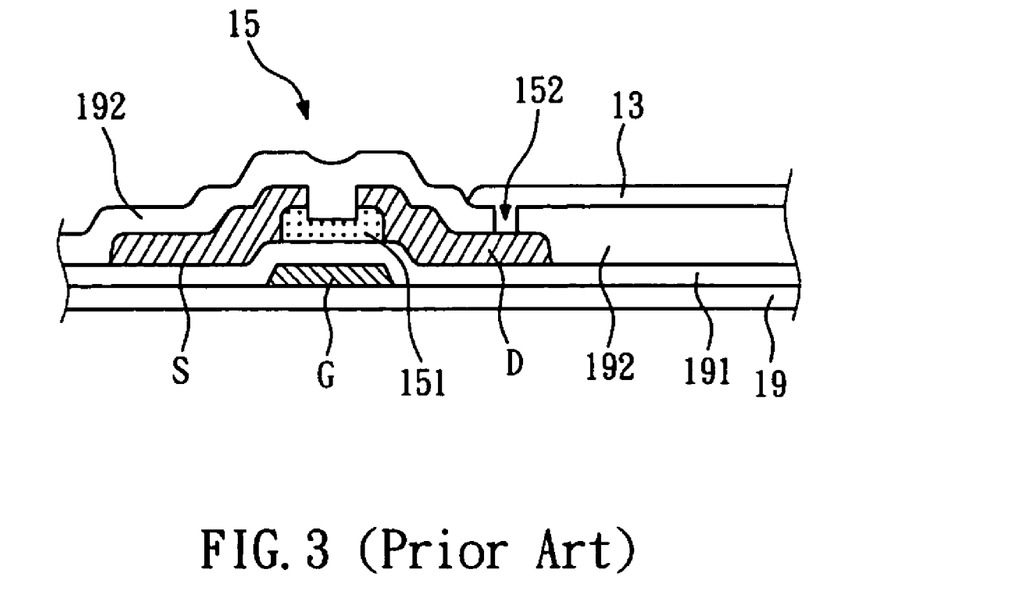
FIG. 3 is a cross-sectional view taken along a line 3-3 of FIG. 2.

Referring to FIGS. 2 and 3, the thin film transistor 15 comprises a gate electrode G, a source electrode S, a drain electrode D and a channel 151. The gate electrode G is connected to the scan line 16, the source electrode S is connected to the data line 11, and the drain electrode D is connected to the pixel electrode 13 by the via hole 152. The formation of this construction is described as follows. First, a first metal layer is formed on a substrate 19 and then patterned to form the gate electrode G and the scan lines 16. Next, an insulation layer 191 is formed to cover the gate electrode G. An amorphous-Si (a-Si) layer is formed above the insulation layer 191 and then patterned to form the channel 151. After that, a second metal layer is formed, and the drain electrode D and the source electrode S are made of the second metal layer by patterning. Then, a protection layer 192 is formed above the drain electrode D and source electrode S so as to cover the insulation layer 191. The via hole 152 is then formed within the protection layer 192 so as to expose the drain electrode D. Finally, the pixel electrode 13 is formed above the protection layer 192.

The scan lines 16 are formed at the same time when the gate electrode G is formed, and the data lines 11 are formed at the same time when the source electrode S and the drain electrode D are formed. The scan lines 16 are insulated from the data lines 11 by the insulation layer 191.

Figure 5:
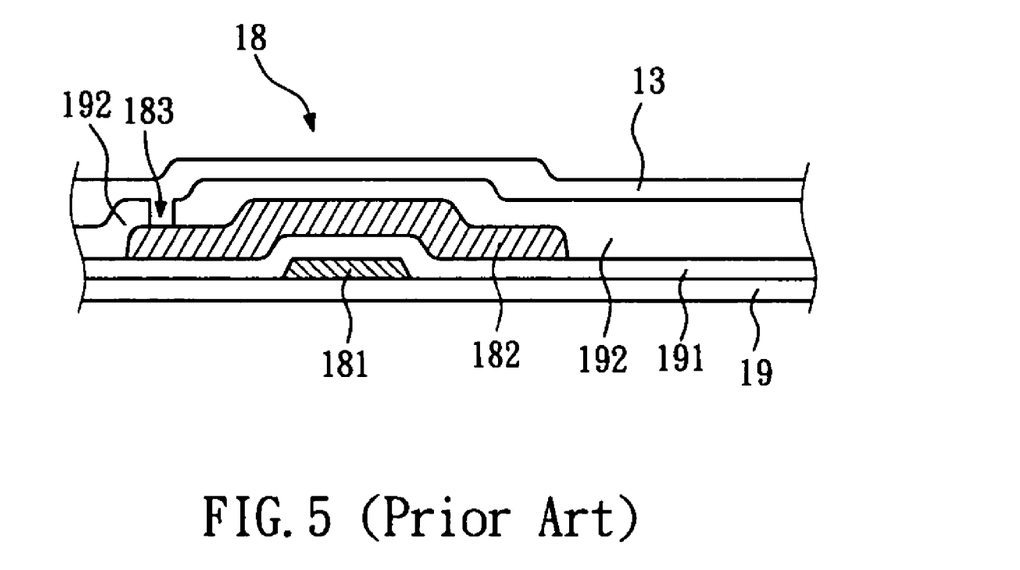
FIG. 5 is a cross-sectional view taken along a line 5-5 of FIG. 4.

Typically, there are two types of storage capacitors, one being constructed on the gate electrode (Cst on gate), as the storage capacitor 18 shown in FIG. 2, the other one being constructed on the common line (Cst on common). The storage capacitors usually utilize the gate electrode G or the common line (the first metal layer) as one electrode, and the second metal layer and the pixel electrode 13 as counter electrode, wherein the second metal layer is electrically connected to the pixel electrode 13 by a via hole 183 of the protection layer 192 (FIG. 5). The overlapping portion of the two electrodes is the main location where the electric charge is stored.

Figure 4:
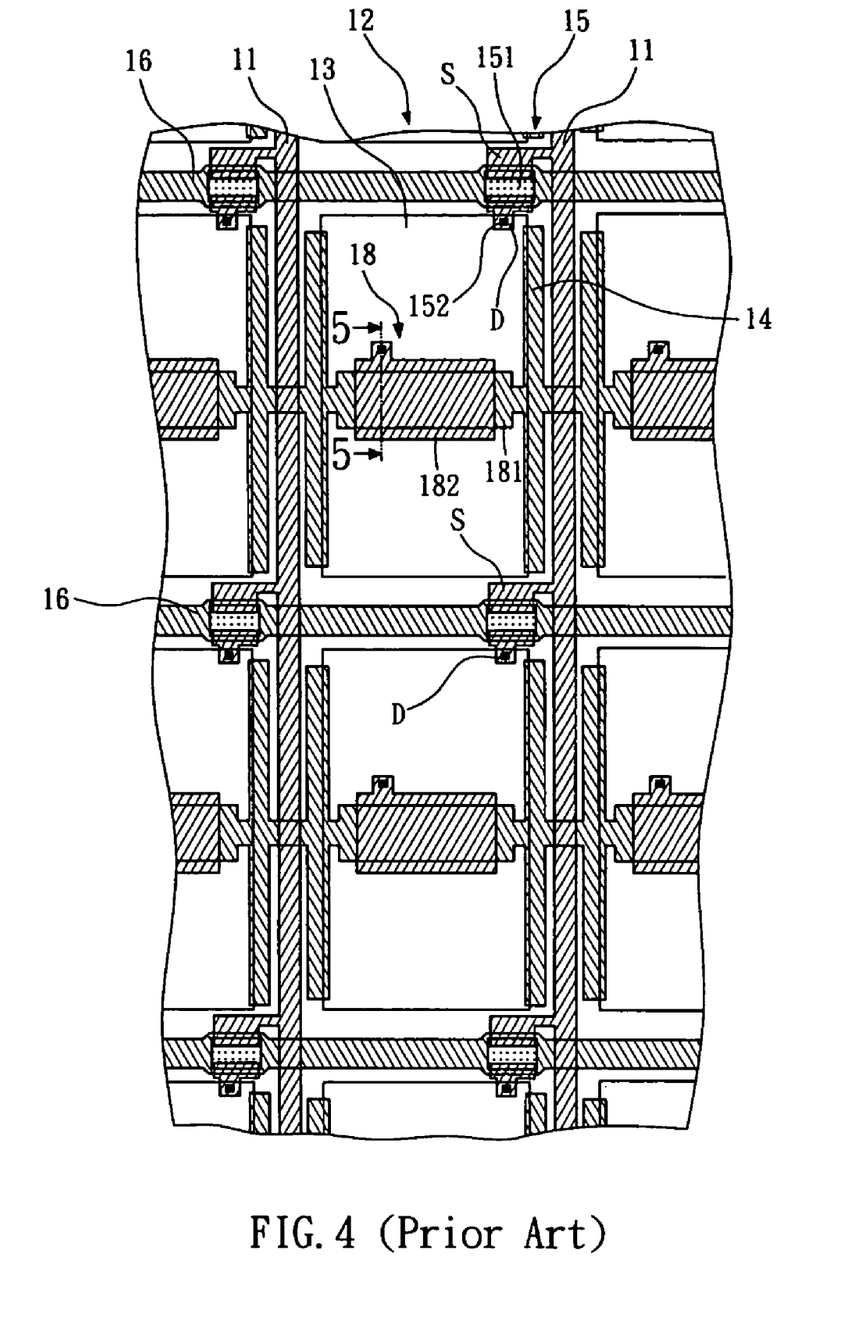
FIG. 4 is a local enlarged view of another conventional display panel.

FIGS. 4 and 5 show a storage capacitor constructed on the common line (Cst on common). The storage capacitor 18 comprises a common electrode 181 and a capacitor electrode 182, which are separated by the insulation layer 191. In such a structure, the material of the dummy data lines 14 is the same as that of the common electrode 181. Therefore, the dummy data lines 14 are circuit lines that connect to the common electrode 181, not floating circuit lines. The formation of storage capacitor 18 is described as follows. First, a first metal layer is formed on the substrate 19 and then patterned to form the common electrode 181 that is connected to the common line. Next, an insulation layer 191 is formed to cover the common electrode 181. After that, a second metal layer is formed above the insulation layer 191, and the capacitor electrode 182 is made of the second metal layer. Then, a protection layer 192 is formed to cover the capacitor electrode 182. The via hole 183 is then formed within the protection layer 192. Finally, the pixel electrode 13 is formed above the protection layer 192, wherein the pixel electrode 13 is electrically connected to the capacitor electrode 182 by the via hole 183. The overlapping portion between the common electrode 181 and the capacitor electrode 182 is the main location where the electric charge is stored.

Referring to FIG. 1, if the data line 11 is disconnected, the segment of the data line below open area A would not be able to receive data, and a defect will be formed. In order to solve the problem, a conventional approach is to add an extra circuit 17 onto the display panel 10 during the manufacturing process. The extra circuit 17 is not electrically connected to the data line 11 under normal condition. When the data line 11 is disconnected, the extra circuit 17 is welded to the data line 11 by laser, as shown in the welding points B, C and D. Therefore, the segment of the data line below open area A can receive data through extra circuit 17.

The disadvantage of the above method is that it must have an additional circuit, which needs more space for routing. In operation, the data lines 11 are grouped, for example, four data lines in FIG. 1 are included in one group, and the data lines in the same group use one extra circuit line. Although the total amount of the extra circuit lines can be reduced, the repair cannot be made when the data lines in the same group are disconnected at the same time.

Consequently, there is an existing need for a novel and improved display panel to solve the above-mentioned problem.

SUMMARY OF THE INVENTION

The primary objective of the invention is to provide a circuit structure of a display panel comprising a plurality of pixel electrodes and a plurality of address lines that are perpendicular to each other and oriented transverse to each other. There is a dummy data line between each pixel electrode and each address line, wherein the address line has at least two protrusions extending to the positions corresponding to the dummy data line. When the address line is disconnected, the protrusions are electrically connected to the dummy data line by laser welding, and the repair can be made without an extra circuit.

The other objective of the invention is that the above protrusion extends to the position corresponding to the pixel electrode. When the thin film transistor that controls the pixel electrode fails, the protrusion is electrically connected to the pixel electrode by laser welding, so that the data on the data line can be written into the pixel electrode directly, and the defect is not easily found.

DETAILED DESCRIPTION OF THE INVENTION

Figure 6:
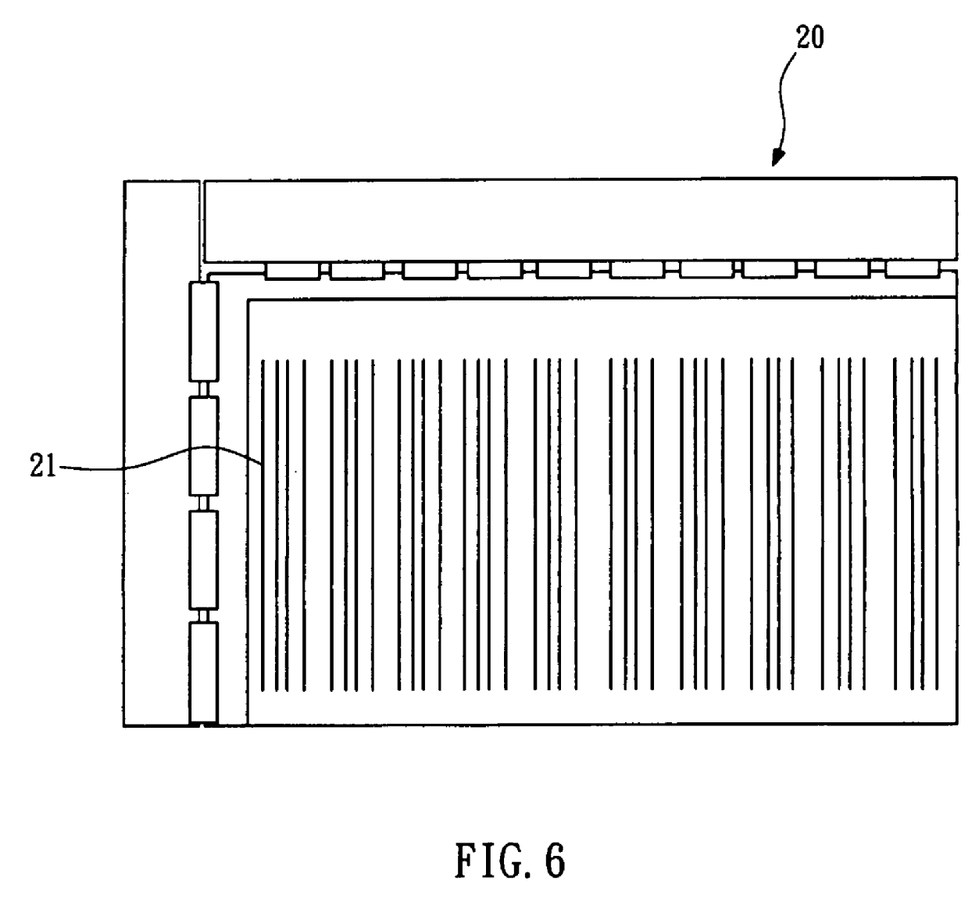
FIG. 6 is a top view of a display panel according to the first embodiment of the present invention.
Figure 7:
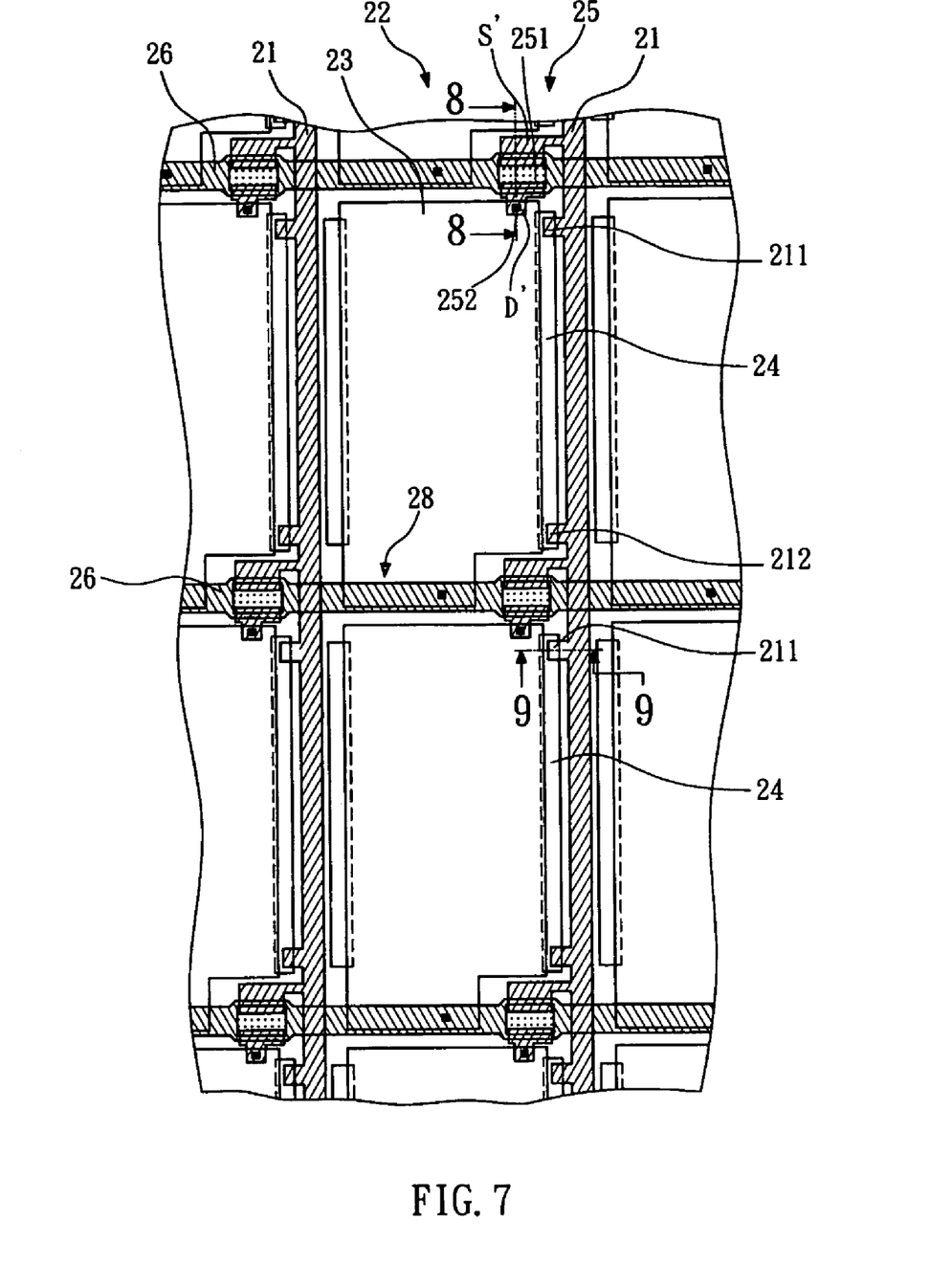
FIG. 7 is a local enlarged view of a display panel according to the first embodiment of the present invention.

Referring to FIGS. 6 and 7, the top and local enlarged views of a display panel according to the first embodiment of the present invention are shown. The display panel 20 comprises a plurality of address lines and a plurality of pixel electrodes 23. The display panel 20 might be used in a liquid crystal display or another type of display. The address lines are a plurality of data lines 21 in the vertical direction and a plurality of scan lines 26 in the horizontal direction. The data lines 21 cross the scan lines 26.

Figure 8:
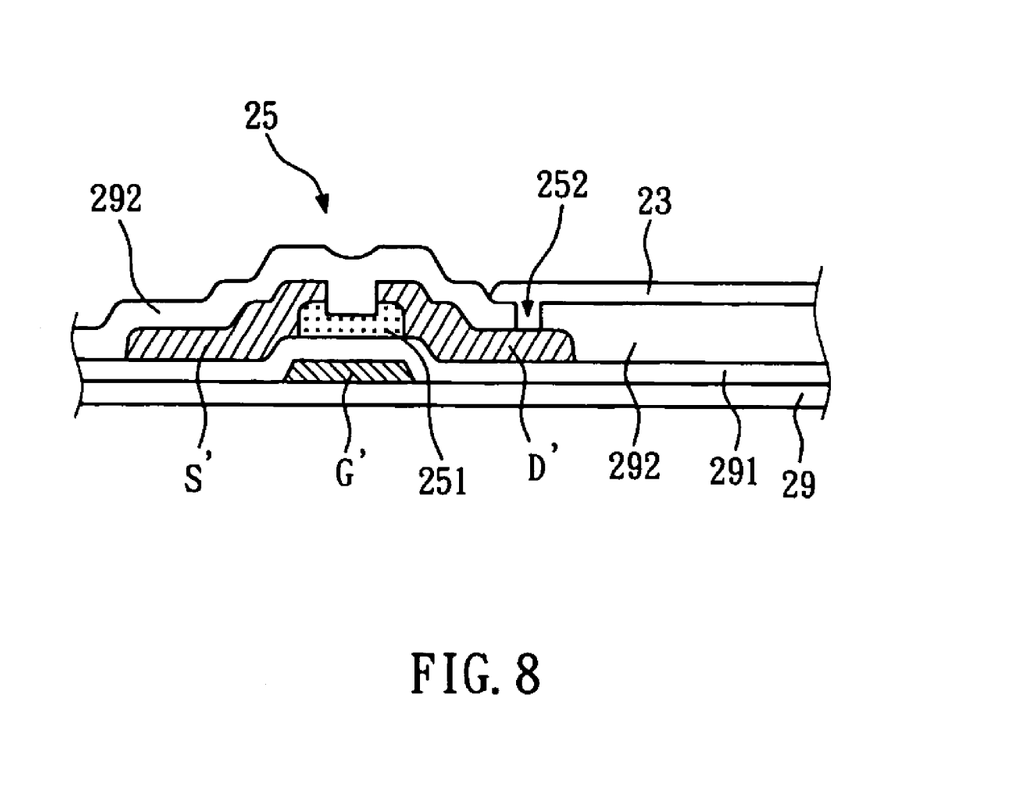
FIG. 8 is a cross-sectional view taken along a line 8-8 of FIG. 7.

FIG. 7 shows a local enlarged view of a display panel according to the first embodiment of the present invention. The display panel 20 comprises at least one circuit structure 22 formed on a substrate 29 (as shown in FIG. 8). The circuit structure 22 comprises at least one data line 21, a scan line 26, a pixel electrode 23, a thin film transistor 25 and a storage capacitor 28. In this embodiment, the storage capacitor 28 is a storage capacitor constructed on a gate electrode (Cst on gate).

There is a dummy data line 24 provided between the pixel electrode 23 and the data line 21. The dummy data line 24 is a floating circuit and comprises an opaque conductive layer for shading light in order to avoid the leakage of light caused by the disclination of the liquid crystal in the margin of the pixel electrode 23 and to increase the tolerance during the alignment of the upper and lower substrates. In other applications, the dummy data line 24 may comprise an opaque layer and a conductive layer. The thin film transistor 25 is electrically connected to the pixel electrode 23 so as to control the pixel electrode 23.

Referring to FIGS. 7 and 8, the thin film transistor 25 comprises a gate electrode G', a source electrode S', a drain electrode D' and a channel 251. The gate electrode G' is connected to the scan line 26, the source electrode S' is connected to the data line 21, and the drain electrode D' is connected to the pixel electrode 23 by the via hole 252. The formation of this construction is described as follows. First, a first metal layer is formed on a substrate 29 and then patterned to form the gate electrode G'. Next, an insulation layer 291 is formed to cover the gate electrode G'. An amorphous-Si (a-Si) layer is formed above the insulation layer 291 and then patterned to form the channel 251. After that, a second metal layer is formed, and the drain electrode D' and the source electrode S' are made of the second metal layer by patterning. Then, a protection layer 292 is formed above the drain electrode D' and source electrode S'. The via hole 252 is then formed within the protection layer 292 so as to expose the drain electrode D'. Finally, the pixel electrode 23 is formed above the protection layer 292 and is electrically connected to the drain electrode D'.

The scan lines 26 are formed at the same time when the gate electrode G' is formed, and the data lines 21 are formed at the same time when the source electrode S' and the drain electrode D' are formed. The scan lines 26 are insulated from the data lines 21 by the insulation layer 291.

The dummy data line 24 is made of the first metal layer, which may be a single or multiple light shading metal layer, and the preferable materials thereof are: chromium (Cr), aluminum (Al), molybdenum (Mo) and aluminum-neodymium alloy. Because the gate electrode G' and the scan lines 26 are also the first metal layer, their materials may be the same as the dummy data line 24 in order to simplify the manufacturing process, which the present invention may not be limited to. In this embodiment, the first metal layer is a two-layered structure, the lower layer is aluminum-neodymium alloy, and the upper layer is molybdenum, which are formed by sputtering process.

Above the first metal layer is the insulation layer 291, whose material is silicon nitride (SiNx), and is formed by plasma-enhanced chemical vapor deposition process.

Above the insulation layer 291 is of a second metal layer, which comprises the data lines 21, the source electrode S' and the drain electrode D'. The insulation layer 291 may be a single or multiple layer, and the preferable material thereof are: molybdenum (Mo), titanium (Ti), tantalum (Ta), tungsten (W), aluminum (Al), molybdenum disilicide ($MoSi_2$), titanium silicide ($TiSi_2$), tantalum silicide ($TaSi_2$), tungsten silicide ($WSi_2$), aluminum silicide (AlSi), aluminum-copper alloy, aluminum-lead alloy, aluminum-neodymium alloy and molybdenum nitride (MoN). In the embodiment, the second metal layer is a three-layered structure, the lower layer is molybdenum nitride, the middle layer is aluminum, and the upper layer is molybdenum nitride, which are formed by sputtering process.

Above the second metal layer is the protection layer 292, which is made of silicon nitride (SiNx), and is formed by plasma-enhanced chemical vapor deposition process.

Above the protection layer 292 is the pixel electrode 23, which is made of the ITO (Indium-Tin-Oxide), and is formed by sputtering process.

The characteristic of the present invention is that two protrusions 211, 212 of the data line 21 extend in a transverse relationship to the dummy data line 24 and forms a first transverse portion that is adapted for forming a joint. That is, the data line 21 does not directly contact the dummy data line 24, but a portion of the data line 21 is disposed above or under the dummy data line 24. In the embodiment, the data line 21 has two protrusions 211,212, whose material is the same as that of the data line 21, and extends to the positions corresponding to the dummy data line 24. The protrusion 211 and the dummy data line 24 form a T-like appearance from top view. Alternatively, the protrusion 211 may cross the dummy data line 24 and form a "□" shaped appearance, or the protrusion 211 may cross the end of the dummy data line 24 and form an inverse L-shaped appearance.

Figure 9:
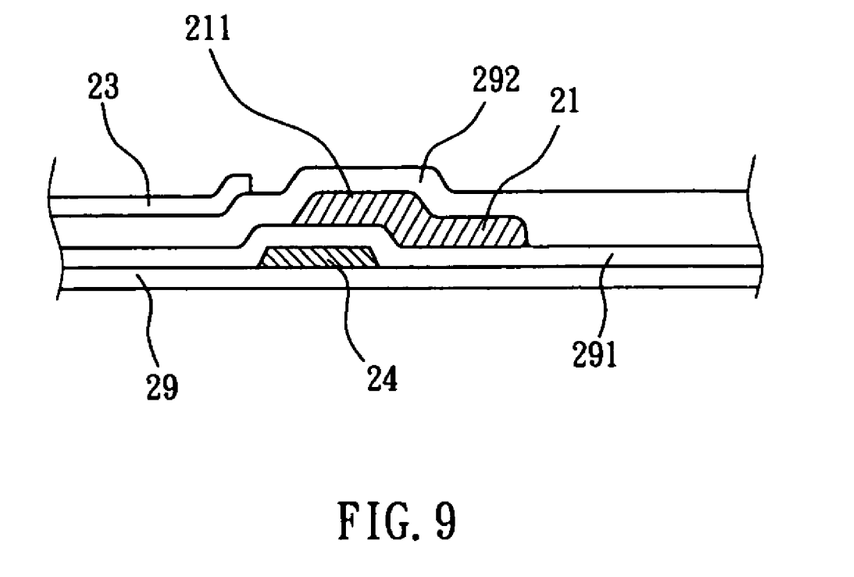
FIG. 9 is a cross-sectional view taken along a line 9-9 of FIG. 7.

FIG. 9 shows a cross-sectional view taken along a line 9-9 of FIG. 7. In the embodiment, the position of the data line 21 is higher than that of the dummy data line 24, and the protrusion 211 extends to the position above the dummy data line 24. Therefore, the data line 21 has a first overlapping portion corresponding to the dummy data line 24 in the projection direction toward the substrate 29. In addition, the data line 21 has a second overlapping portion corresponding to the protrusion 212. Alternatively, the position of the data line 21 is lower than that of the dummy data line 24, and the protrusion 211 extends to the position under the dummy data line 24.

Figure 10:
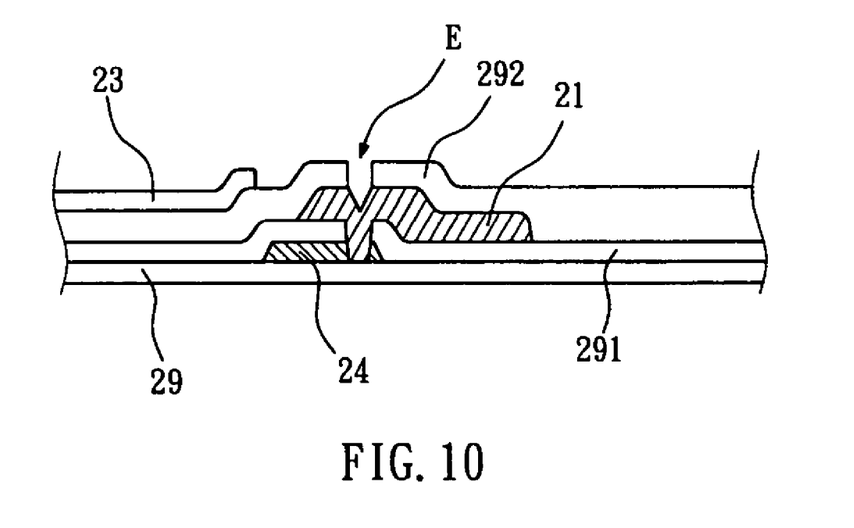
FIG. 10 shows the connection of the protrusion and the dummy data line of FIG. 9.

FIG. 10 shows the connection of the protrusion and the dummy data line of FIG. 9. When the data line 21 is disconnected from the segment between the two protrusions 211, 212, a laser is applied to weld the two protrusions 211,212 and the dummy data line 24 respectively, so that the protrusions 211,212 are electrically connected to the dummy data line 24. That is, joints are formed by utilizing the first and second overlapping portions, as the welding point E show, whereby the data on the data line 21 can be transmitted continuously through the dummy data line 24.

Figure 11:
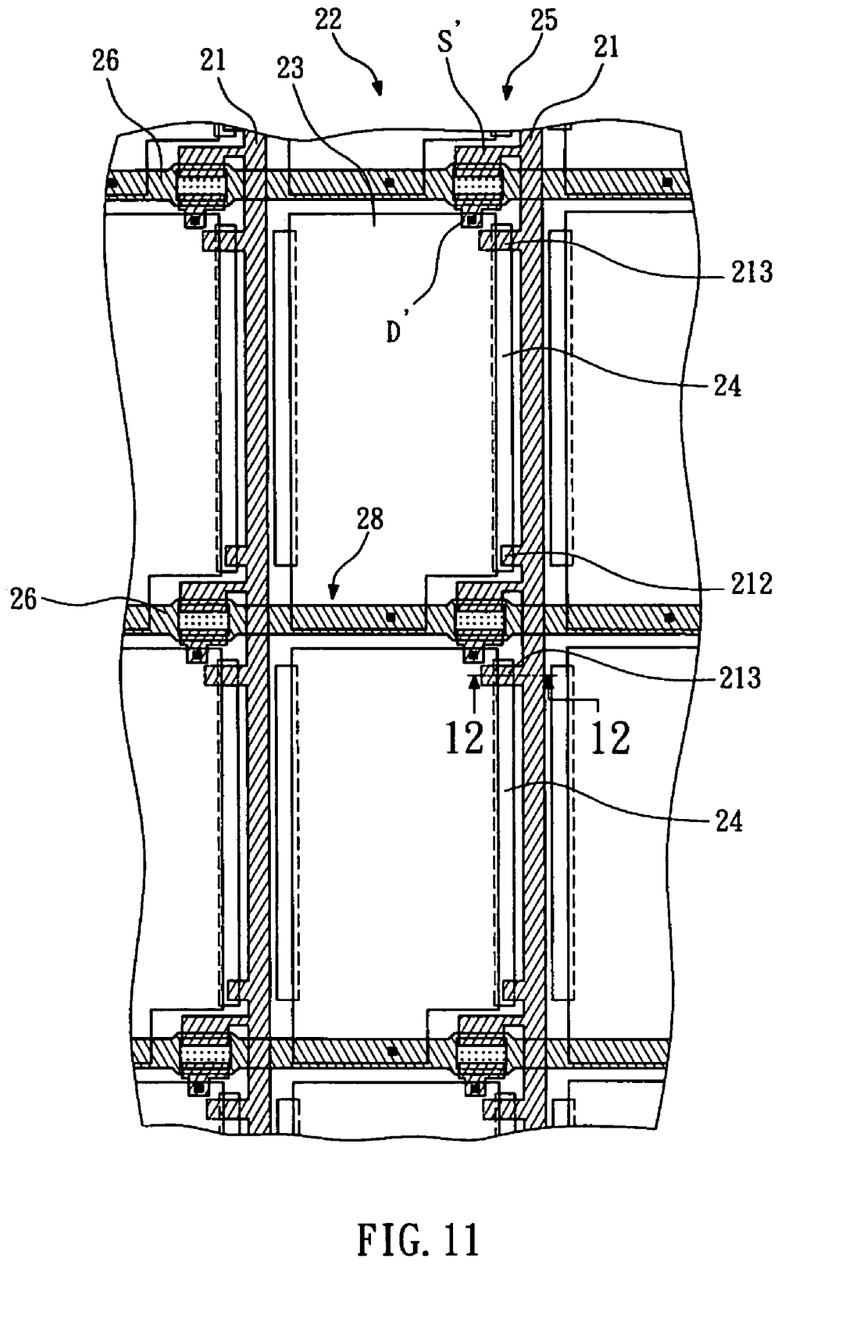
FIG. 11 is a local enlarged view of a display panel according to the second embodiment of the present invention.

FIG. 11 shows a local view of a display panel according to the second embodiment of the present invention. The embodiment is substantially equal to the first embodiment, except that at least one protrusion (for example, protrusion 213) extends to the position corresponding to the pixel electrode 23. That is, the data line 21 extends in a transverse relationship to the pixel electrode 23.

Figure 12:
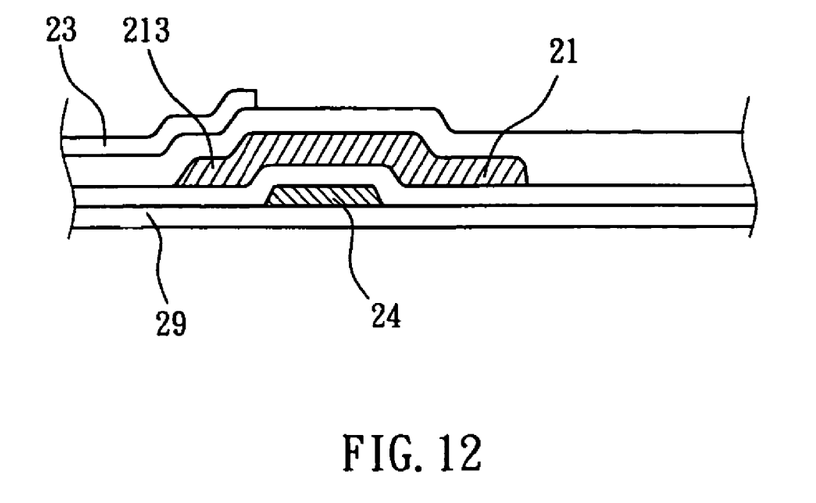
FIG. 12 is a cross-sectional view taken along a line 12-12 of FIG. 11.

FIG. 12 shows a cross-sectional view taken along a line 12-12 of FIG. 11. The position of the data line 21 is lower than that of the pixel electrode 23, and the protrusion 213 extends to the position under the pixel electrode 23. Therefore, the data line 21 has a third overlapping portion corresponding to the pixel electrode 23 in the projection direction toward the substrate 29. Alternatively, the position of the data line 21 is higher than that of the pixel electrode 23, and the protrusion 213 extends to the position above the pixel electrode 23.

Figure 13:
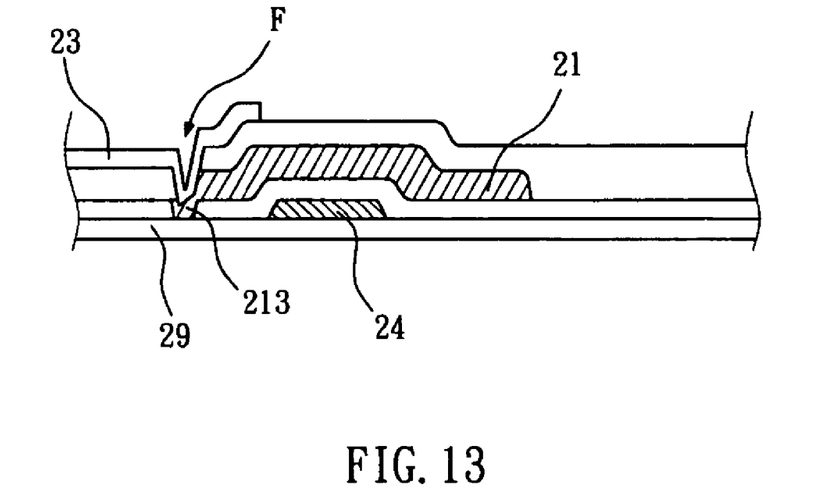
FIG. 13 shows the connection of the protrusion and the pixel electrode of FIG. 12.

FIG. 13 shows the connection of the protrusion and the pixel electrode of FIG. 9. When the thin film transistor 25 (shown in FIG. 11) that controls the pixel electrode 23 fails, the data on the data line 21 cannot be written into the pixel electrode 23, thus the pixel electrode 23 is a defect of bright point or dark point. In order to repair the defect, the protrusion 213 is connected to the pixel electrode 23 by utilizing laser welding, that is, a joint is formed by welding the third overlapping portion, as the welding point F shown, whereby the data on the data line 21 can be written into the pixel electrode 23 directly. Although the thin film transistor 25 cannot be replaced in above-described method, the chance of such defect to be found can be reduced.

Figure 14:
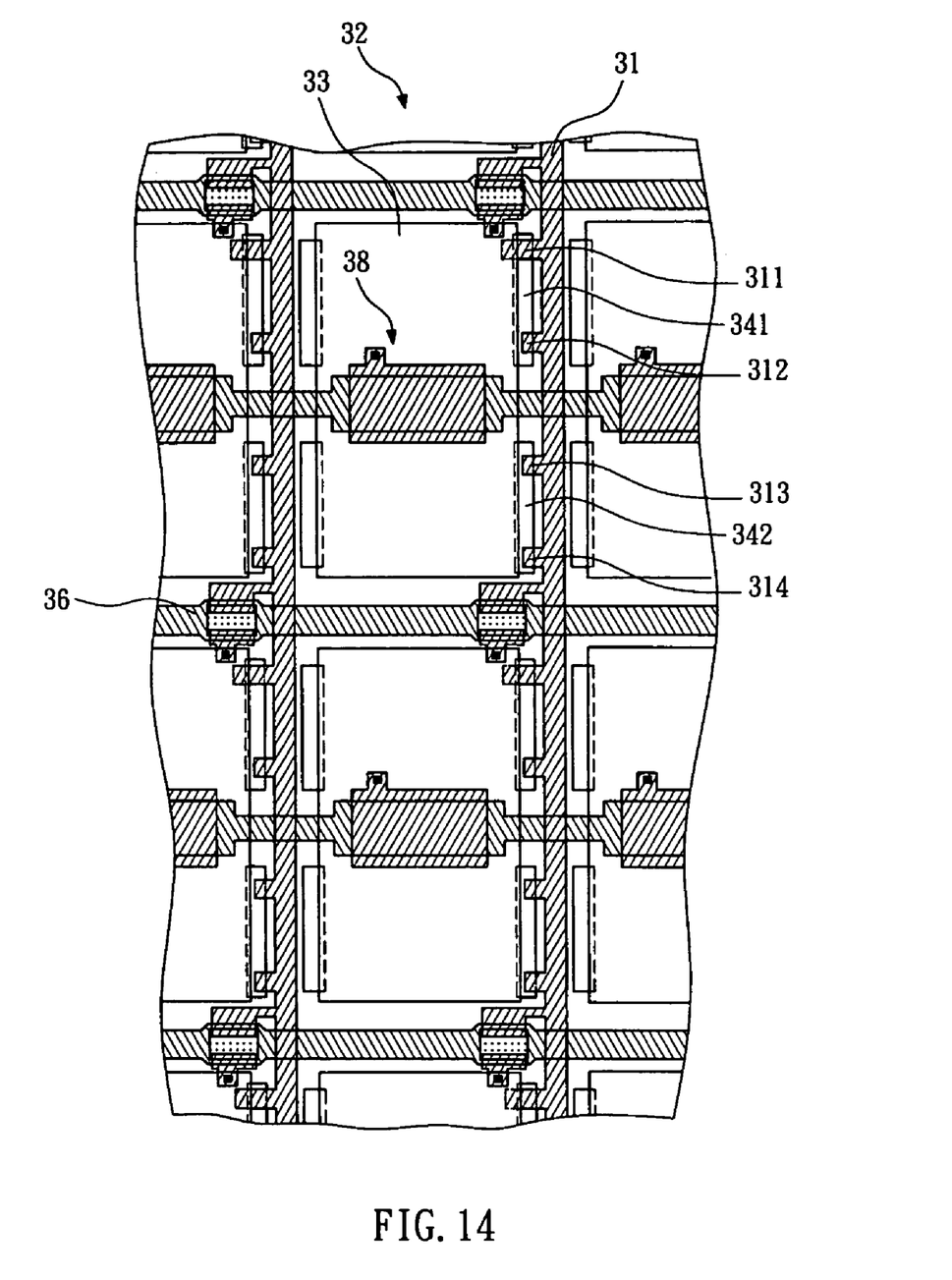
FIG. 14 is a local enlarged view of a display panel according to the third embodiment of the present invention.

FIG. 14 shows a local view of a display panel according to the third embodiment of the present invention. The embodiment is substantially equal to the second embodiment, except that the storage capacitor 38 is a storage capacitor constructed on a common line (Cst on common). Because the scan line 36 and the dummy data line are at the same layer, one dummy data line in a circuit structure 32 is divided into two segments 341, 342. The data line 31 corresponding to one segment has two protrusions, wherein the data line 31 corresponding to the segment 341 has two protrusions 311,312, and the data line 31 corresponding to the segment 342 has two protrusions 313, 314. Therefore, in the embodiment, the data line 31 corresponding to one pixel electrode 33 has four protrusions 311, 312,313,314. It is to be noted that only one of the four protrusions 311,312,313,314 is needed to extend to the position corresponding to the pixel electrode 33, for example, protrusion 341.

Figure 15:
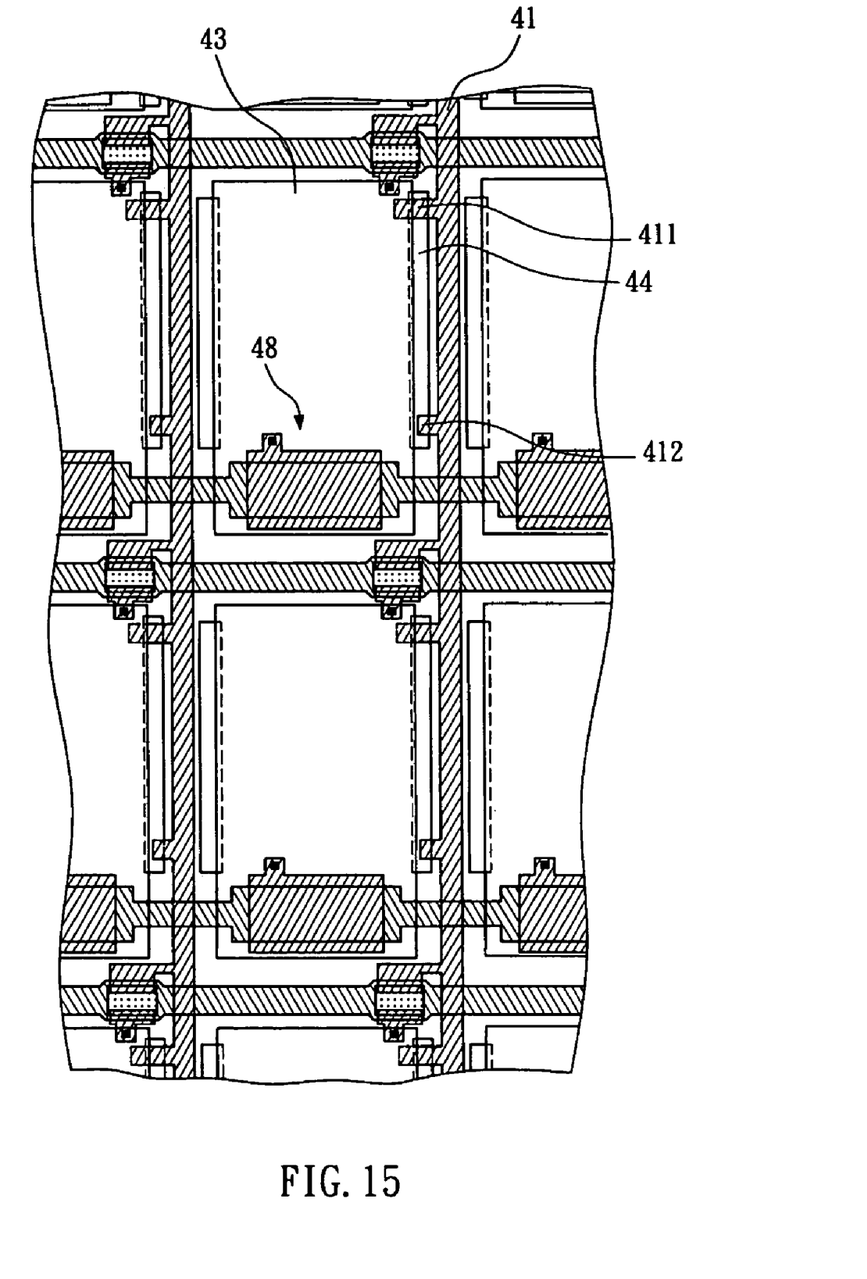
FIG. 15 is a local view of a display panel according to the fourth embodiment of the present invention.

FIG. 15 shows a local view of a display panel according to the fourth embodiment of the present invention. The embodiment is substantially equal to the third embodiment, except that the storage capacitor 48 is disposed at the position under one end of the pixel electrode 43. Therefore, in the embodiment, the data line 41 corresponding to one dummy data line 44 has two protrusions 411,412. Accordingly, the dummy data line 44 can vary depending on the design of the circuit structure.

While several embodiments of this invention have been illustrated and described, various modifications and improvements can be made by those skilled in the art. The embodiments of this invention are therefore described in an illustrative but not restrictive sense. It is intended that this invention may not be limited to the particular forms as illustrated, and that all modifications which maintain the spirit and scope of this invention are within the scope as defined in the appended claims.

What is claimed is:

1. A display panel comprising:
  a substrate; and
  a circuit structure formed on the substrate, the circuit structure comprising
    an address line having a first protruding portion, a second protruding portion and a nonprotruding portion;
    a pixel electrode having a pixel electrode edge, the pixel electrode edge having a first overlapping portion and a nonoverlapping portion, wherein the first overlapping portion overlaps the first protruding portion of the address line; and
  a dummy data line disposed between the pixel electrode and the address line, the dummy data line having a conductive metal layer,
  wherein the first protruding portion is adapted to form a first joint,
  wherein the second protruding portion is adapted to form a second joint, and
  wherein the dummy data line is spaced at an interval from the nonprotruding portion of the address line and overlaps the first protruding portion and the second protruding portion of the address line.

2. A display panel according to claim 1, wherein the dummy data line is a floating circuit.

3. A display panel according to claim 2, further comprising a common signal line, and wherein the dummy data line is isolated from the common signal line and comprises the same material as the common signal line.

4. A display panel according to claim 1, wherein the dummy data line comprises an opaque layer.

5. A display panel according to claim 1, wherein the address line is configured for electrical coupling with the dummy data line via the first protruding portion.

6. A display panel according to claim 1, wherein the first protruding portion is configured for electrical coupling to the dummy data line, the second protruding portion being configured for electrical coupling to the dummy data line.

7. A display panel according to claim 6, wherein the first protruding portion corresponds to the pixel electrode, and the first protruding portion is adapted to connect the address line and the pixel electrode.

8. A display panel according to claim 7, wherein the first protruding portion is configured for electrical coupling to the pixel electrode.

9. A display panel according to claim 1, wherein the display panel is a liquid crystal display panel.

10. A display panel according to claim 1, wherein the dummy data line has an edge overlapping the pixel electrode, and further comprising a first insulating film disposed between the dummy data line and the first protruding portion of the address line.

11. A display panel according to claim 10, wherein a second insulating film and the first insulating film are disposed between the dummy data line and the overlapping edge of the pixel electrode.

12. A method of fabricating a display panel comprising:
    forming a circuit structure on a substrate, the circuit structure comprising:
        an address line having a first protruding portion, a second protruding portion and a nonprotruding portion;
        a pixel electrode having a pixel electrode edge, the pixel electrode edge having a first overlapping portion and a nonoverlapping portion, wherein the first overlapping portion overlaps the first protruding portion of the address line; and
        a dummy data line disposed between the pixel electrode and the address line, the dummy data line having a conductive metal layer,
    wherein the first protruding portion is adapted to form a first joint,
    wherein the second protruding portion is adapted to form a second joint, and
    wherein the dummy data line is spaced at an interval from the nonprotruding portion of the address line and overlaps the first protruding portion and the second protruding portion of the address line.

13. The method of claim 12, wherein the dummy data line is a floating circuit.

14. The method of claim 13, further comprising a common signal line, and wherein the dummy data line is isolated from the common signal line and comprises the same material as the common signal line.

15. The method of claim 12, wherein the dummy data line comprises an opaque layer.

16. The method of claim 12, wherein the address line is configured for electrical coupling with the dummy data line via the first protruding portion.

17. The method of claim 12, wherein the first protruding portion is configured for electrical coupling to the dummy data line, the second protruding portion being configured for electrical coupling to the dummy data line.

18. The method of claim 17, wherein the first protruding portion corresponds to the pixel electrode, and the first protruding portion is adapted to connect the address line and the pixel electrode.

19. The method of claim 18, wherein the first protruding portion is configured for electrical coupling to the pixel electrode.

20. The method of claim 12, wherein the display panel is a liquid crystal display panel.

21. The method of claim 12, wherein the dummy data line has an edge overlapping the pixel electrode, and further comprising a first insulating film disposed between the dummy data line and the first protruding portion of the address line.

22. The method of claim 21, wherein a second insulating film and the first insulating film are disposed between the dummy data line and the overlapping edge of the pixel electrode.

* * * * *